(12) United States Patent
Hogan et al.

(10) Patent No.: US 8,448,229 B2
(45) Date of Patent: *May 21, 2013

(54) METHODS AND SYSTEMS FOR PROVIDING WEBSITE HOSTING SECURITY

(75) Inventors: Peter P. Hogan, O'Fallon, MO (US); James Hood, St. Charles, MO (US); Sekhar Nadella, St. Peters, MO (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/177,818

(22) Filed: Jul. 7, 2011

(65) Prior Publication Data

US 2011/0265171 A1    Oct. 27, 2011

Related U.S. Application Data

(63) Continuation of application No. 11/953,587, filed on Dec. 10, 2007, now Pat. No. 8,001,585.

(51) Int. Cl.
*H04L 29/06* (2006.01)

(52) U.S. Cl.
USPC .................................................. 726/6; 726/7

(58) Field of Classification Search
USPC ........................................................ 726/6, 7
See application file for complete search history.

(56) References Cited

U.S. PATENT DOCUMENTS

| | | |
|---|---|---|
| 5,983,208 A | 11/1999 | Haller et al. |
| 6,233,608 B1 | 5/2001 | Laursen et al. |
| 6,564,261 B1 | 5/2003 | Gudjonsson et al. |
| 6,633,878 B1 | 10/2003 | Underwood |
| 7,069,451 B1 | 6/2006 | Ginter et al. |
| 7,120,800 B2 | 10/2006 | Ginter et al. |
| 7,124,302 B2 | 10/2006 | Ginter et al. |
| 7,257,581 B1 | 8/2007 | Steele et al. |
| 7,290,288 B2 | 10/2007 | Gregg et al. |
| 7,761,330 B2 | 7/2010 | Yoshimine et al. |
| 2009/0150995 A1 | 6/2009 | Hogan et al. |

*Primary Examiner* — Jacob Lipman
(74) *Attorney, Agent, or Firm* — Armstrong Teasdale LLP

(57) ABSTRACT

A method for registering user identification data in an application service provider data repository is provided, where the application service provider provides web services for a plurality of customers, each customer having a plurality of users with respective user identification data. The method includes receiving user identification data from one of the users through a website associated with one of the plurality of customers, retrieving customer identification data based on a uniform resource locator assigned to the website, concatenating the user identification data and customer identification data to create a user key, and registering a user account within the data repository based on the created user key.

20 Claims, 5 Drawing Sheets

METHODS AND SYSTEMS FOR PROVIDING WEBSITE HOSTING SECURITY

CROSS REFERENCE TO RELATED APPLICATIONS

This application is a continuation application of application Ser. No. 11/953,587 filed on Dec. 10, 2007 now U.S. Pat. No. 8,001,585, which is hereby incorporated by reference in its entirety.

BACKGROUND OF THE INVENTION

This invention relates generally to a method and system for providing website hosting security, and more particularly to a network-based system and method for providing security to websites hosted by an application service provider, wherein the application service provider hosts a plurality of websites for customers and stores user information in a single repository for a user having accounts with one or more of the customers.

Financial transaction cards have made great gains in the United States as a means to attract financial accounts to financial institutions and, in the case of credit cards, as a medium to create small loans and generate interest income for financial institutions. Nonetheless, the financial transaction card industry is subject to some problems.

Financial transaction cards are frequently utilized as the payment medium when a consumer makes an online purchase. Web sites of online sellers are typically hosted by an application service provider. The application service provider may host web sites for multiple online sellers. Typically, the consumer has to register with the seller, and this is generally done by providing information such that an account for the consumer is created at the application service provider. Oftentimes, when registering with the seller, the consumer will provide a transaction card number that will be utilized for current and/or future purchases. The application hosting industry is not limited to the buyer and seller example described above. By way of further example, users of financial transaction cards are often able to register online to view statements, pay bills, and the like. A similar application is where a user can access their bank balances and make other transactions with their financial institution.

At least one known example of an application service provider hosting a website includes an application service provider hosting a website for customer A and customer B. Customers A and B might be retailers, as one example, in which case they would have customers, referred to as "users" herein. Accordingly, Customer A would have users that have accounts with Customer A, and Customer B would have users that have accounts with Customer B. Certain individual users will have accounts with both Customer A and Customer B. Currently, to keep data associated with users unique and secure, the application service provider maintains two different data repositories for user information, one data repository each for Customer A and Customer B.

In order to maintain PCI compliance (e.g., Payment Card Industry Data Security (PCI DSS) compliance), when User A logs into either Customer A's website or Customer B's website, both hosted by the single application service provider, the application service provider has to store the user information for User A in separate repositories, even though the User A may utilize the same user ID and password for both their Customer A account and their Customer B account. One problem with this model is that the solution requires dedicated electronic hardware and/or dedicated software repositories for each of the user IDs associated with a single user.

Accordingly, a system and method for managing accounts at the application service provider level is needed so that repetition and duplication of account information is avoided while still remaining PCI compliant.

BRIEF DESCRIPTION OF THE INVENTION

In one aspect, a method for registering user identification data in an application service provider data repository, where the application service provider provides web services for a plurality of customers is provided. Each customer has a plurality of users with respective user identification data. The method includes receiving user identification data from one of the users through a website associated with one of the plurality of customers, retrieving customer identification data based on a uniform resource locator associated with the website, concatenating the user identification data and customer identification data to create a user key, and registering a user account for storage within the data repository based on the created user key.

In another aspect, a network-based system for registering users for one or more of a plurality of customers utilizing user information is provided. The system is operable to provide application services to the plurality of customers and includes a client system having a browser, a database for storing user account data and customer identification data, and a server system configured to be coupled to the client system and the database. The server system is further configured to receive user identification data from the client system, the user identification data entered at the client system by a user through an interface associated with one of the plurality of customers, retrieve customer identification data based on the interface accessed by the user with the client system, concatenate the user identification data and customer identification data to create a user key, and register a user account in the database based on the created user key.

In still another aspect, a computer program embodied on a computer readable medium is provided for registering users for multiple customers for whom application services are provided such that the registered users for all the customers are capable of being stored in a single data repository while still retaining payment card industry (PCI) compliance. The program includes at least one code segment that identifies the customer with which the user is attempting to register based on a uniform resource locator utilized by the user, receives the user identification data entered into an interface by the user, concatenates the user identification data and customer identification data based on the identified customer, and registers a user account in the data repository based on the concatenation of the user identification data and customer identification data.

In yet another aspect, a method for registering users within a repository associated with an application service provider is provided where the application service provider provides website hosting services to a plurality of customers, and where the users engage in financial transaction card related transactions through the customer websites. The method includes identifying the customer with which the user is attempting to register based on a web page accessed by the user, receiving a potential user identifier as entered by the user, retrieving a customer identifier for the identified customer, combining the potential user identifier and customer identifier into user data, and storing the user data in the data repository if the user data is not within the data repository.

DETAILED DESCRIPTION OF THE INVENTION

Described in detail herein are exemplary embodiments of systems and processes that facilitate registration of users by an application service provider that provides web services to a plurality of customers, each having registered users. Some of the users may be registered with more than one of the application service provider's customers. Until the presently provided embodiments, these "overlapping" user accounts had to be maintained in separate data repositories to maintain payment card industry (PCI) compliance. The systems and processes facilitate, for example, maintenance of a single data repository for all of the customer's registered user accounts by concatenating customer information to user identification information. Such a system and method allows for a single user identifier to be used more than once, in the single data repository, provided that each user identifier instance is associated with a different customer of the application service provider.

A technical effect of the systems and processes described herein include at least one of (a) maintaining a single data repository for user accounts of multiple customers; (b) allowing multiple instances of specific user identification information by concatenating user identification data with customer identification data; and (c) utilizing a uniform resource locator entered by a user at a client system to determine which customer identification data should be concatenated with the user information data.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

Figure 1:
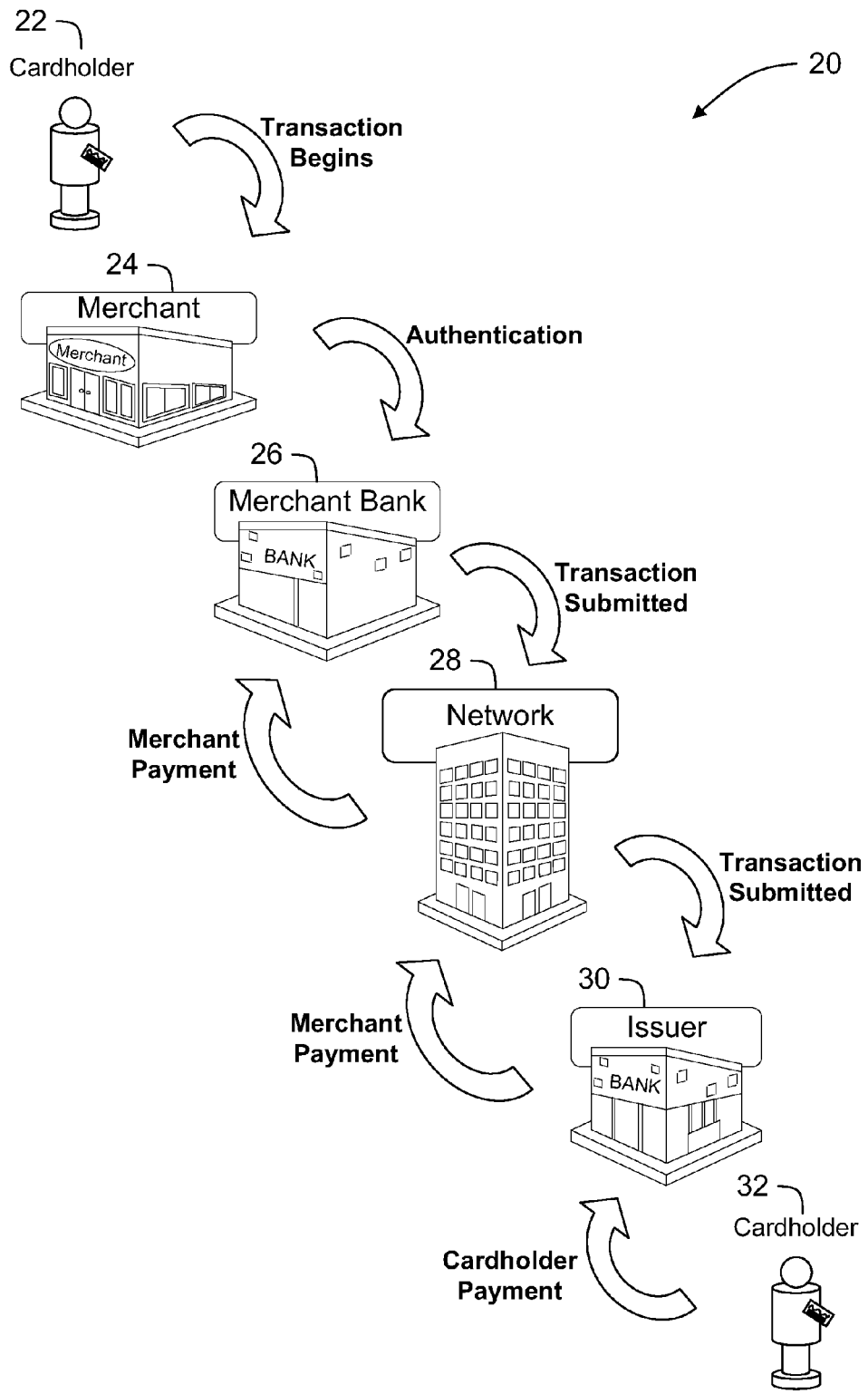
FIG. 1 is a flowchart illustrating a typical financial transaction using a financial transaction card payment system.

FIG. 1 is a flowchart 20 illustrating a typical financial transaction using a financial transaction card payment system. The present invention is related, in at least one aspect, to a financial transaction card payment system, such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated® (MasterCard is a registered trademark of MasterCard International Incorporated located in Purchase, N.Y.).

In a typical financial payment system, a financial institution called the "issuer" issues a financial transaction card, such as a credit card, to a consumer, who uses the financial transaction card to tender payment for purchases from a merchant, including online purchases. To accept payment with the financial transaction card, the merchant must normally establish an account with a financial institution that is part of the financial payment system. In addition, for online purchasers, the merchant typically has accounts with one or more application service providers, which provide web site hosting capabilities for the merchants, which are referred to herein as customers as they are customers of the application service providers.

These merchants typically also have accounts with a financial institution that is usually called the "merchant bank" or the "acquiring bank" or "acquirer bank." When a consumer 22 tenders payment for a purchase with a financial transaction card, the merchant 24, or application service provider, requests authorization from the merchant bank 26 for the amount of the purchase. The request may be performed over the telephone, through the use of a point-of-sale terminal which reads the consumer's account information from the magnetic stripe on the financial transaction card and communicates electronically with the transaction processing computers of the merchant bank. Alternatively, and relevant to the current disclosure, the consumer will enter the transaction card account number and other information into a user interface of a website hosted by the application service provider. In addition, a merchant bank may authorize a third party to perform transaction processing on its behalf. Such a third party is usually called a "merchant processor" or an "acquiring processor."

Using the interchange 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

After a transaction is captured, the transaction is settled between the merchant, the merchant bank, and the issuer.

Settlement refers to the transfer of financial data or funds between the merchant's account, the merchant bank, and the issuer related to the transaction. Usually, transactions are captured and accumulated into a "batch," which are settled as a group.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 2:
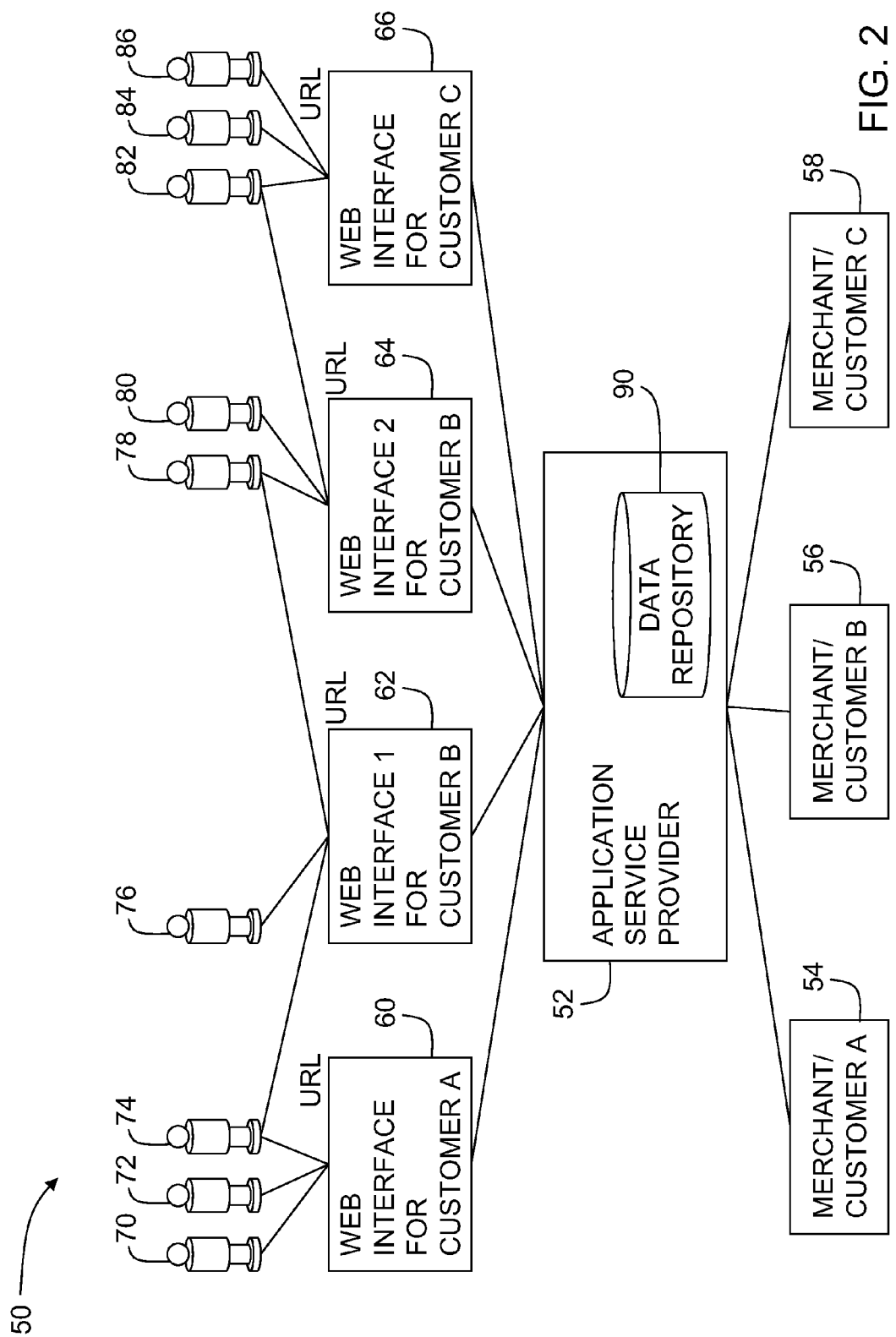
FIG. 2 is a block diagram illustrating relationships with an application service provider.

FIG. 2 is a block diagram 50 further illustrating the relationships between users, merchants (customers), and an application service provider 52. As described elsewhere herein, the application service provider 52 provides web interface services for a plurality of customers, specifically, maintenance of websites and associated uniform resource locators that provide users an opportunity to access services via the Internet. Example relationships between users and customers include the buyer/seller relationship, a bill payment application, and an account maintenance interface just to name a few. For simplicity, the buyer/seller relationship is utilized as the illustrative example.

Now referring specifically to FIG. 2, application service provider 52 provides web interface services for customer A 54, customer B 56, and customer C 58. In one embodiment, customer A 54, customer B 56, and customer C 58 are merchants that have their respective websites hosted by application service provider 52. These services include maintenance of websites including web interfaces 60, 62, 64, and 66. Web interface 60 is associated with customer A 54, and web interface 66 is associated with customer C 58. The application service provider 52 can maintain more than one web interface for a customer. To illustrate, web interfaces 62 and 64 are associated with customer B 56. In one scenario, different uniform resource locators are utilized to access web interface 62 and web interface 64.

Users 70, 72, 74, 76, 78, 80, 82, 84, and 86 are representative of users of client systems as further described below. These users access the respective web interfaces 60, 62, 64, and 66, for example, to make online purchases, inquiries, and the like. In one usual case, the user has a home computer, connects to the Internet, and accesses a web interface for one of the application service provider's customers by entering a uniform resource locator, to purchase goods and/or services utilizing their financial transaction card.

To utilize such a convenient business medium, the user has to maintain an account with the customer, that includes a user identifier, which may be referred to as user identification data. This account information, as further described below, is maintained in a data repository 90 by the application service provider 52. As also shown in FIG. 2, users may have an account with more than one of the customers. To provide a specific illustration, user 74 has accounts with both customer A 54 and customer B 56 and user 82 has accounts with both customer B 56 and customer C 58. User 78 has two accounts with customer B as he has accessed (and registered user identification) via the two different websites (web interface 62 and 64).

In a known system, an application service provider maintains separate data repositories for each of their customers. Through maintenance of separate data repositories, each of customers A, B, and C (54, 56, and 58) can have a user account that has the same user identification data. However, maintenance of separate data repositories is difficult and expensive. In the configuration of FIG. 2, and as further explained below, a single data repository 90 is maintained. This single data repository for multiple customers is possible due to a user identifier storage methodology. Specifically, user identification data is received from one of the users, customer identification data is retrieved based on a uniform resource locator entered by the user, the user identification data and customer identification data is concatenated to create a user key, and user accounts are registered, or provisioned, in the data repository 90 based on the created user key. Before explaining the above outlined process in detail, a description of the computer systems that enable the process is provided.

Figure 3:
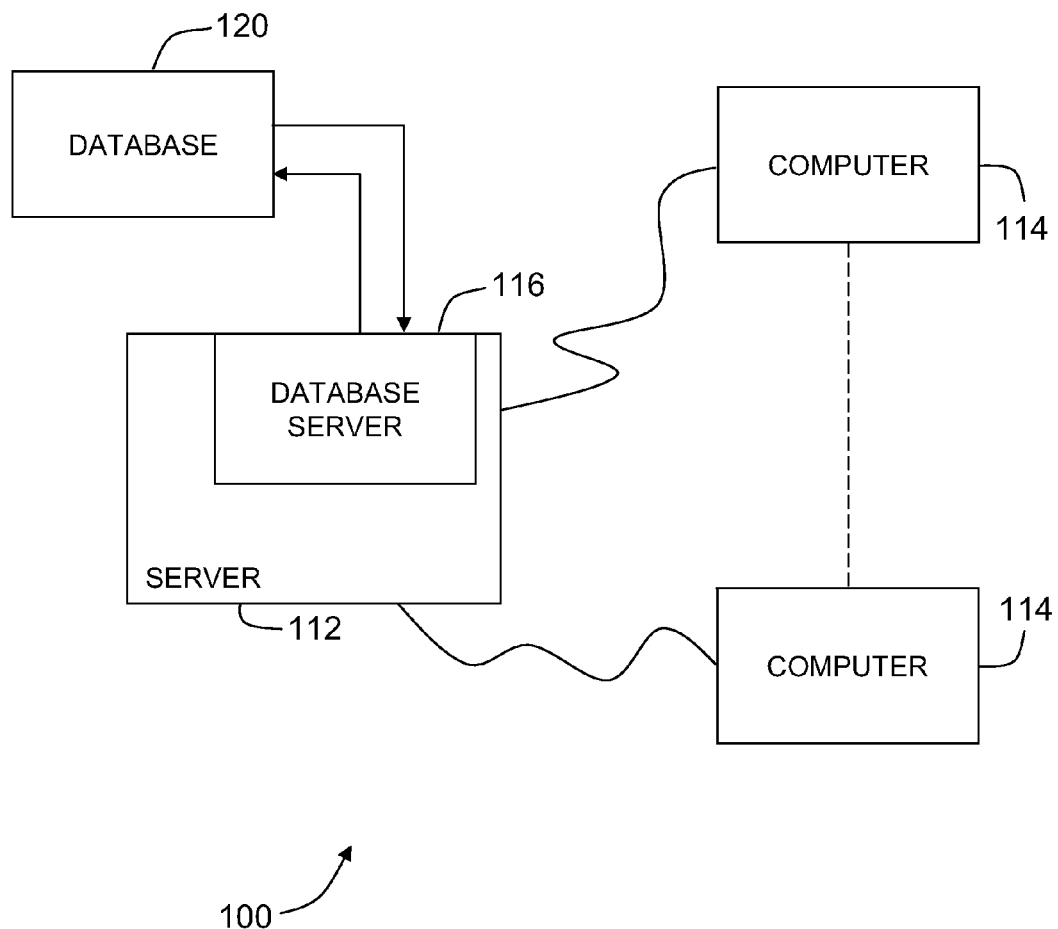
FIG. 3 is a simplified block diagram of an exemplary embodiment of a server architecture of a system in accordance with one embodiment of the present invention.

FIG. 3 is a simplified block diagram of an exemplary system 100 in accordance with one embodiment of the present invention. In one embodiment, system 100 is the financial transaction card payment system shown in FIG. 1, which can be utilized for processing transactions as described above. More specifically, in the example embodiment, system 100 includes a server system 112, operated by the application service provider for purposes of the herein disclosed embodiments, and a plurality of client sub-systems, also referred to as client systems 114, connected to server system 112. In one embodiment, client systems 114 are computers, operated for example by the users illustrated in FIG. 2, including a web browser, such that server system 112 is accessible to client systems 114 using the Internet via various uniform resource locators as described above. In one embodiment, and as described herein, server system 112 is provided by an application service provider, for example, as a provider of computer related services for one or more merchant customers, which in turn are customers of an interchange operator. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A user repository server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized. As discussed below, user profiles including account information such as user identification data and/or password are stored within database 120 which is equivalent to the data repository 90 of FIG. 2.

Figure 4:
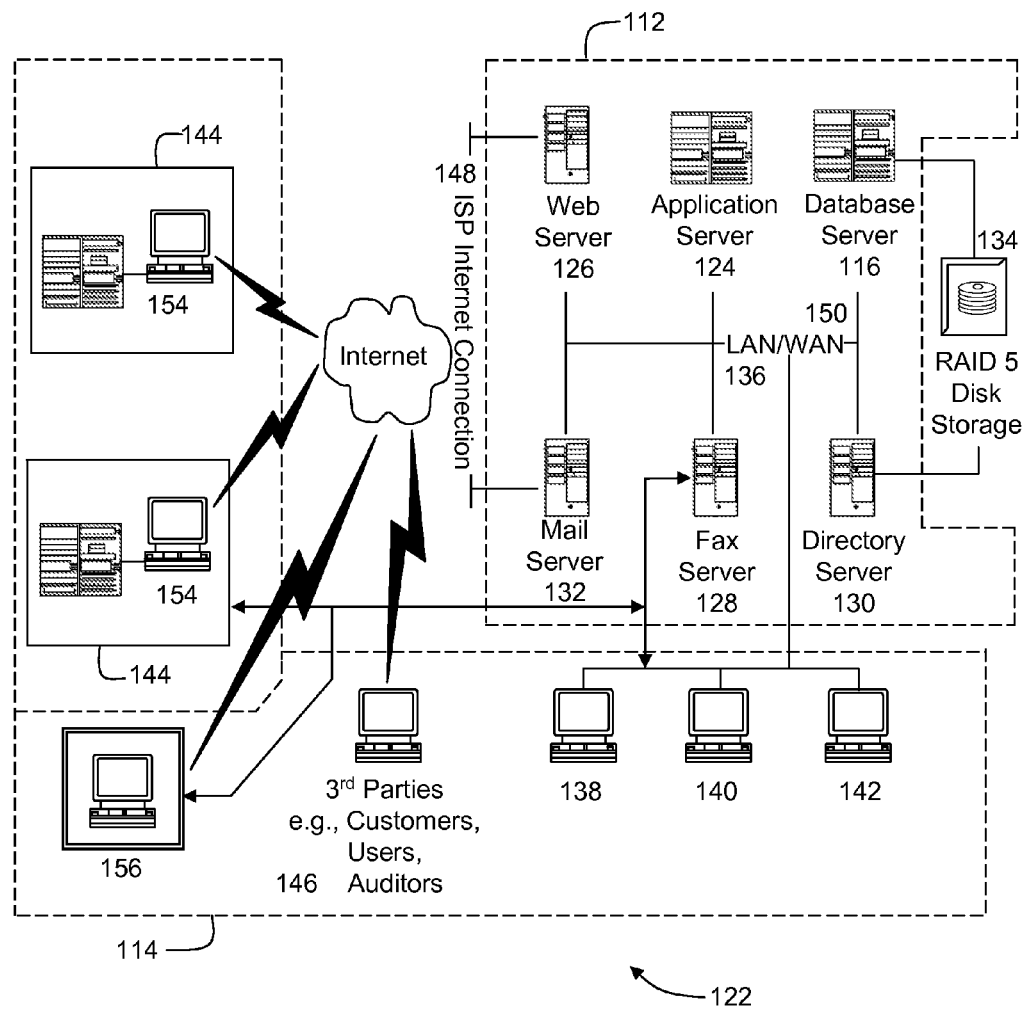
FIG. 4 is an expanded block diagram of an exemplary embodiment of a server architecture of a system in accordance with one embodiment of the present invention.

FIG. 4 is an expanded block diagram of an exemplary embodiment of a server architecture of a system 122 in accordance with one embodiment of the present invention. Components in system 122, identical to components of system 100 (shown in FIG. 3), are identified in FIG. 4 using the same reference numerals as used in FIG. 3. System 122 includes server system 112 and client systems 114. Server system 112 further includes user repository server 116, an application server 124, a web server 126, a fax server 128, a directory server 130, and a mail server 132. A disk storage unit 134 is coupled to user repository server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

In one embodiment, the user repository server 116 utilizes a lightweight directory access protocol (LDAP). In an alternative embodiment, user repository server 116 incorporates a relational database management system (RDBMS) for database management. However, it should be understood that other database management systems and methodologies can be utilized to support the operation of the user repository server 116 and any other databases incorporated within system 122.

Each workstation, 138, 140, and 142 is generally a personal computer having a web browser and are representative of home computers utilized by the users 70-86 in FIG. 2. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., customers, users, or auditors, 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

The systems (100 and 122) are operable for implementation of a security model that provides customers an advantage if they use services from the same application service provider for the hosting of different web applications for different entities. Specifically, the provided advantage, as illustrated by flowchart 200 of FIG. 5, is the provided capability to maintain a single user identifier and password for a user for multiple applications hosted by an application service provider, where the user identification data is stored uniquely and securely based on the customer identification data as mentioned above.

Figure 5:
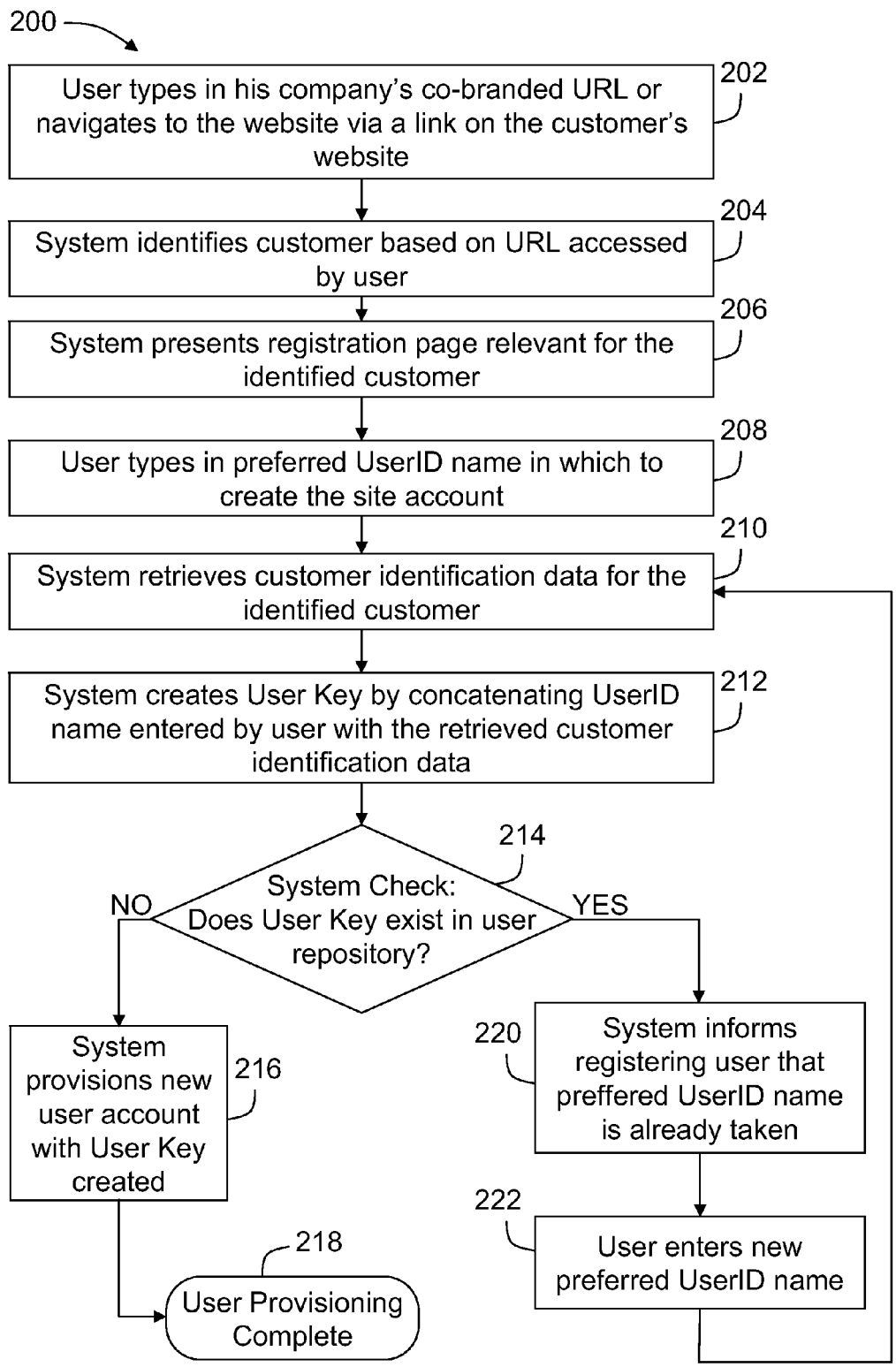
FIG. 5 is a flowchart illustrating exemplary processes for creating and maintaining user identification data in conjunction with customer identification data.

This security model utilizes the process described in FIG. 5 to ensure that each user identifier is unique to entities having their web services hosted by the application service provider, but to the user this security feature would appear transparent. In summary, the method includes adding customer identification data to either the beginning or end of user identification data upon registration of the user, storing the combined identifier as a unique user key in a repository, and adding the customer identification data to the entered user identification for each login request based on the uniform resource locator (URL), or more commonly the web site address, accessed by the end user. This method allows, for example, the same user to have the same "visible" user identifier and password for each customer website that is hosted by the application service provider without requiring the application service provider to maintain separate data repositories for each customer for which a web service is hosted.

Now referring specifically to flowchart 200 of FIG. 5, a user navigates 202 to an entity's website via a link or by entering a uniform resource locator, where the entity is a customer of the application service provider. The system associated with the application service provider identifies 204 the customer based on the uniform resource locator and presents 206 a registration webpage to the user that is relevant to the identified 204 customer of the application service provider.

The potential user enters 208 a preferred user identifier (user identification data) in an attempt to create an account for the customer in the data repository of the application service provider. The system then retrieves 210 the customer identification data associated with the identified 204 customer and creates 212 a user key by concatenating the user identification data with the customer identification data. The system determines 214 whether or not the created 212 user key already exists in the repository of the application service provider.

If the created 212 user key does not exist in the repository, the system operates to provision, or register 216, a new user account in the repository based on the created user key to complete 218 user account registration 216.

If the created 212 user key does exist in the repository, the system operates to inform 220 the user that their preferred user identifier is being utilized by another user, and the user is prompted 222 to try another preferred user identifier to determine whether or not it exists in the repository.

As mentioned elsewhere herein, the systems and processes described herein are not limited to the buyer/seller type transactions utilized herein as the descriptive examples. In addition, the methods and systems are operable for any type of transaction where a user registers to have an account where such accounts are maintained by an application service provider. In other embodiments, a computer and a computer program are provided which are configured or programmed to perform steps similar to those already recited herein.

While the invention has been described in terms of various specific embodiments, those skilled in the art will recognize that the invention can be practiced with modification within the spirit and scope of the claims.

What is claimed is:

1. A method for verifying an individual to access a user account in an application service provider data repository within a computer memory device, wherein the application service provider provides web services for a plurality of customers, each customer having a plurality of users with respective user identification data, said method comprising:
receiving user identification data from the individual through a website hosted on a server, the website associated with one of the plurality of customers;
retrieving customer identification data based on a uniform resource locator associated with the website;
concatenating the user identification data and customer identification data to create a user key; and
authenticating access to the user account based on the created user key.

2. A method according to claim 1 wherein retrieving customer identification data comprises identifying the customer based on the uniform resource locator.

3. A method according to claim 1 wherein authenticating access to the user account comprises determining if the created user key exists in the data repository.

4. A method according to claim 1 wherein concatenating the user identification data and customer identification data comprises one of:
　　appending the customer identification data to the user identification data; and
　　prepending the customer identification data to the user identification data.

5. A method according to claim 1 wherein said receiving user identification data from an individual includes receiving a user password and wherein said concatenating includes creating a user key that includes the user identification data including the user password.

6. A method according to claim 1 wherein the one of the plurality of customers is a financial transaction card issuer.

7. A method according to claim 6 wherein the individual is at least one of a cardholder of the financial transaction card issuer, and a representative of the financial transaction card issuer.

8. A network-based system for verifying access to user information for one or more of a plurality of customers utilizing said user information, said system operable to provide application services to the plurality of customers, said system comprising:
　　a database for storing user account data and customer identification data, said database within one or more computer memory devices; and
　　a server system configured to be coupled to a client system and said database, said server system further configured to:
　　　　receive user identification data from the client system, the user identification data entered at the client system by an individual through an interface associated with one of the plurality of customers;
　　　　retrieve customer identification data based on the interface accessed by the individual with the client system;
　　　　concatenate the user identification data and customer identification data to create a user key; and
　　　　authenticate access to the user account data associated with the user identification data based on the created user key.

9. A network-based system according to claim 8 wherein to retrieve customer identification data from said database, said server system is configured to identify the customer based on a uniform resource locator entered at the client system.

10. A network-based system according to claim 8 wherein to authenticate access to the user account data, said server system is configured to determine if the created user key exists in said database.

11. A network-based system according to claim 8 wherein to concatenate the user identification data and customer identification data, said server system is configured to either:
　　append the customer identification data to the user identification data; and
　　prepend the customer identification data to the user identification data.

12. A network-based system according to claim 8 wherein the user identification data includes a user password and wherein said server system is configured to concatenate the user identification data including the user password and customer identification data to create the user key.

13. A network-based system according to claim 8 wherein one of the plurality of customers is a financial transaction card issuer.

14. A network-based system according to claim 13 wherein the individual is at least one of a cardholder of the financial transaction card issuer, and a representative of the financial transaction card issuer.

15. A computer program embodied on a non-transitory computer readable medium for verifying access to user information for multiple customers for whom application services are provided such that account data for users of all the customers are capable of being stored in a single data repository while still retaining payment card industry (PCI) compliance, said program comprising at least one code segment that:
　　identifies the customer with which the individual is attempting to log in based on a uniform resource locator utilized by the individual;
　　concatenates user identification data received from the individual and customer identification data based on the identified customer; and
　　authenticates access to the account data associate with the user identification data based on the concatenation of the user identification data and customer identification data.

16. A computer program according to claim 15 wherein to authenticate access to the account data associated with the user identification data, said computer program further comprises at least one code segment that:
　　determines if the concatenation of the user identification data and customer identification data has been previously registered as a user account.

17. A computer program according to claim 15 wherein said computer program further comprises at least one code segment that:
　　receives the user identification data entered into an interface by the individual.

18. A computer program according to claim 15 wherein to concatenate user identification data received from the user and customer identification data based on the identified customer, said computer program further comprises at least one code segment that:
　　appends the customer identification data to the user identification data.

19. A computer program according to claim 15 wherein to concatenate user identification data received from the user and customer identification data based on the identified customer, said computer program further comprises at least one code segment that:
　　prepends the customer identification data to the user identification data.

20. A computer program according to claim 15 wherein the user identification data includes a user password and wherein said computer program includes at least one code segment that concatenates the user identification data including the user password and customer identification data.

* * * * *